(12) United States Patent
Pucci et al.

(10) Patent No.: US 10,741,060 B2
(45) Date of Patent: Aug. 11, 2020

(54) CONTEXT-SENSITIVE REMOTE CONTROL DEVICE

(71) Applicant: Bose Corporation, Framingham, MA (US)

(72) Inventors: Lino Antony Pucci, Wellesley Hills, MA (US); Douglas Jeans Cunningham, II, Groton, MA (US); John D. Joyce, Canton, MA (US); Brian Robert White, Hudson, MA (US); Paul William Larsen, Watertown, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/832,311

(22) Filed: Dec. 5, 2017

(65) Prior Publication Data

US 2019/0172339 A1    Jun. 6, 2019

(51) Int. Cl.
| | | |
|---|---|---|
| *G08C 17/02* | (2006.01) | |
| *H04N 5/44* | (2011.01) | |
| *H04N 21/422* | (2011.01) | |
| *G06F 3/0489* | (2013.01) | |
| *G08C 17/00* | (2006.01) | |

(52) U.S. Cl.
CPC ........... *G08C 17/02* (2013.01); *G06F 3/0489* (2013.01); *G08C 17/00* (2013.01); *H04N 5/4403* (2013.01); *H04N 21/4221* (2013.01); *H04N 21/42222* (2013.01); *H04N 21/42225* (2013.01); *G08C 2201/30* (2013.01); *G08C 2201/34* (2013.01); *G08C 2201/51* (2013.01); *G08C 2201/92* (2013.01); *G08C 2201/93* (2013.01); *H04N 2005/4439* (2013.01)

(58) Field of Classification Search
None
See application file for complete search history.

(56) References Cited

U.S. PATENT DOCUMENTS

| | | | | |
|---|---|---|---|---|
| 6,947,101 B2* | 9/2005 | Arling | ................... | G08C 17/00 348/734 |
| 2002/0084929 A1* | 7/2002 | Stefanik | ................. | G08C 17/00 341/176 |
| 2004/0268391 A1* | 12/2004 | Clercq | ................. | H01H 9/0235 725/37 |
| 2005/0066370 A1 | 3/2005 | Alvarado et al. | | |
| 2008/0117085 A1* | 5/2008 | Garfio | ................... | G08C 17/02 341/23 |

(Continued)

OTHER PUBLICATIONS

International Search Report and Written Opinion for International Application No. PCT/US2018/063767, dated Feb. 11, 2019, 14 pages.

*Primary Examiner* — Curtis J King
(74) *Attorney, Agent, or Firm* — Hoffman Warnick LLC

(57) ABSTRACT

Various implementations include approaches for controlling content via a playback device. In a particular implementation, a remote control device includes: a keypad having a set of actuatable buttons for controlling a playback device; and a control module, where the remote control device is operable in a plurality of different operating states, and where the control module is configured to highlight one or more distinct subsets of the set of actuatable buttons at the keypad based upon a current operating state of the remote control device.

15 Claims, 8 Drawing Sheets

(56) References Cited

U.S. PATENT DOCUMENTS

| | | | | |
|---|---|---|---|---|
| 2010/0115405 A1* | 5/2010 | Chang | .................... | G06F 3/0416 |
| | | | | 715/702 |
| 2010/0123669 A1* | 5/2010 | Chae | .................... | G06F 3/0488 |
| | | | | 345/173 |
| 2011/0018817 A1* | 1/2011 | Kryze | .................... | G08C 17/02 |
| | | | | 345/173 |
| 2011/0181386 A1* | 7/2011 | Lee | ................ | G08C 17/00 |
| | | | | 340/4.3 |
| 2012/0253483 A1* | 10/2012 | Cavarec | ................ | G08C 17/02 |
| | | | | 700/83 |
| 2014/0267931 A1* | 9/2014 | Gilson | ................ | H04N 5/4403 |
| | | | | 348/734 |
| 2014/0268628 A1* | 9/2014 | Mann | .................... | G08C 17/00 |
| | | | | 362/23.1 |
| 2016/0104371 A1* | 4/2016 | Selfe | .................... | G08C 17/02 |
| | | | | 340/4.32 |
| 2017/0229008 A1* | 8/2017 | Frusciano | .............. | G08C 23/00 |
| 2017/0344132 A1* | 11/2017 | Chandel | ................ | G06F 3/0346 |

* cited by examiner

CONTEXT-SENSITIVE REMOTE CONTROL DEVICE

TECHNICAL FIELD

This disclosure generally relates to remote control devices. More particularly, the disclosure relates to remote control devices and related systems providing an operating state-specific set of controls for managing content across a plurality of devices.

BACKGROUND

Multi-modal entertainment systems are becoming more commonplace. In these configurations, a variety of content delivery devices such as televisions, audio systems, video game systems and/or streaming content devices are linked to one or more controllers having a variety of keys capable of controlling multiple devices. However, interacting with these conventional controllers often requires an understanding of the particular commands that are applicable to each of the controlled devices. That is, a conventional controller keypad can include dozens of keys, only some of which are applicable to each device to be controlled. This configuration can frustrate and confuse users, detracting from the entertainment experience.

SUMMARY

All examples and features mentioned below can be combined in any technically possible way.

Various implementations include approaches for controlling content via a playback device. In particular implementations, a remote control device is disclosed. In other particular implementations, a system including a playback device and a remote control is disclosed.

In some particular aspects, a remote control device includes: a keypad having a set of actuatable buttons for controlling a playback device; and a control module, where the remote control device is operable in a plurality of different operating states, and where the control module is configured to highlight one or more distinct subsets of the set of actuatable buttons at the keypad based upon a current operating state of the remote control device.

In other particular aspects, a system includes: a playback device; and a remote control device operable in a plurality of different operating states and communicatively coupled with the playback device, the remote control device having: a keypad including a set of actuatable buttons for controlling the playback device; and a control module configured to highlight one or more distinct subsets of the set of actuatable buttons at the keypad based upon a current operating state of the remote control device.

In some cases, the remote control device further includes a light source coupled with the control module and located proximate the keypad, where the light source is configured to highlight one or more of the distinct subsets of the set of actuatable buttons in response to a highlight command from the control module.

In certain implementations, the actuatable buttons are substantially invisible to a user's naked eye in a resting state, and in response to detecting movement of the remote control device or user contact with the keypad, the control module is configured to highlight one or more of the distinct subsets of the set of actuatable buttons at the keypad based upon the current operating state of the remote control device. In particular cases, the remote control device further includes: a communications module coupled with the control module, where the communications module is configured to communicate with the playback device to detect a current operating state of the playback device in response to the detected movement of the remote control device or user contact with the keypad, and based upon the communication, update the current operating state of the remote control device to coincide with the current operating state of the playback device. According to some implementations, the communications module is configured to communicate with the playback device over a Bluetooth communications protocol, a Bluetooth Low Energy (BLE) communications protocol, a radio frequency (RF) communications protocol, a wireless local area networking communications protocol, a Zigbee communications protocol, a Z-Wave communications protocol, a Wi-Fi communications protocol, a Wi-Fi direct communications protocol, or a proprietary RF communications protocol.

In particular cases, the remote control device further includes a motion detector coupled with the control module. In certain implementations, the motion detector includes at least one of a gyroscope, an optical sensor, or an accelerometer.

According to some aspects, the playback device is configured to control operation of a plurality of other devices, the plurality of other devices including at least one of an audio content source or a video content source.

In particular implementations, the playback device is configured to receive control commands from a separate controller distinct from the remote control device, where the separate controller is configured to modify a current operating state of the playback device, and where the control module is configured to update the current operating state of the remote control device by highlighting one or more of the distinct subsets of the actuatable buttons based upon the modified current operating state of the playback device.

In some cases, the keypad further includes a set of permanent buttons distinct from the set of actuatable buttons at the keypad.

In certain aspects, each of the highlighted distinct subsets of the actuatable buttons corresponds with at least one function associated with the current operating state of the remote control device.

In particular implementations, the remote control device is operable to control one or more other devices via the playback device.

In certain cases, in at least one of the operating states of the remote control device, the remote control device is configured to control another device via the playback device.

In particular implementations, the keypad further includes a set of source buttons each corresponding to a different one of the operating states of the remote control device, where the source buttons are operable to select the current operating state of the remote control device. According to some aspects, the remote control device is configured to distinguish the source button associated with the current operating state of the remote control device from the other source buttons in the set of source buttons.

According to certain implementations, the remote control device further includes: a light source coupled with the control module and located proximate the keypad, where the light source is configured to distinguish a source button associated with the current operating state of the remote control device from other source buttons associated with distinct operating states of the remote control device via at least one of a relative difference in illumination or a difference in color. In some cases, the remote control device further includes: a light source coupled with the control module and located proximate the keypad, where the light source is configured to perform at least one of: highlighting one or more of the distinct subsets of the set of actuatable buttons in response to a highlight command from the control module, highlighting a source button on the keypad associated with the current operating state of the remote control device from other source buttons on the keypad associated with distinct operating states of the remote control device, or distinguishing the source button associated with the current operating state of the remote control device from the other source buttons associated with the distinct operating states of the remote control device via at least one of a relative difference in illumination or a difference in color.

In certain implementations, the actuatable buttons are substantially invisible to a user's naked eye in a resting state, and in response to detecting movement of the remote control device or user contact with the keypad, the control module is configured to highlight one or more of the distinct subsets of the set of actuatable buttons at the keypad based upon the current operating state of the remote control device, wherein the remote control device further includes: a communications module coupled with the control module, wherein the communications module is configured to communicate with the playback device to detect a current operating state of the playback device in response to the detected movement of the remote control device or user contact with the keypad, and based upon the communication, update the current operating state of the remote control device to coincide with the current operating state of the playback device.

In particular cases, the playback device is configured to perform at least one of: controlling operation of a plurality of other devices, or receiving control commands from a separate controller distinct from the remote control device, where the separate controller is configured to modify a current operating state of the playback device, and where the control module is configured to update the current operating state of the remote control device by highlighting one or more of the distinct subsets of the actuatable buttons based upon the modified current operating state of the playback device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
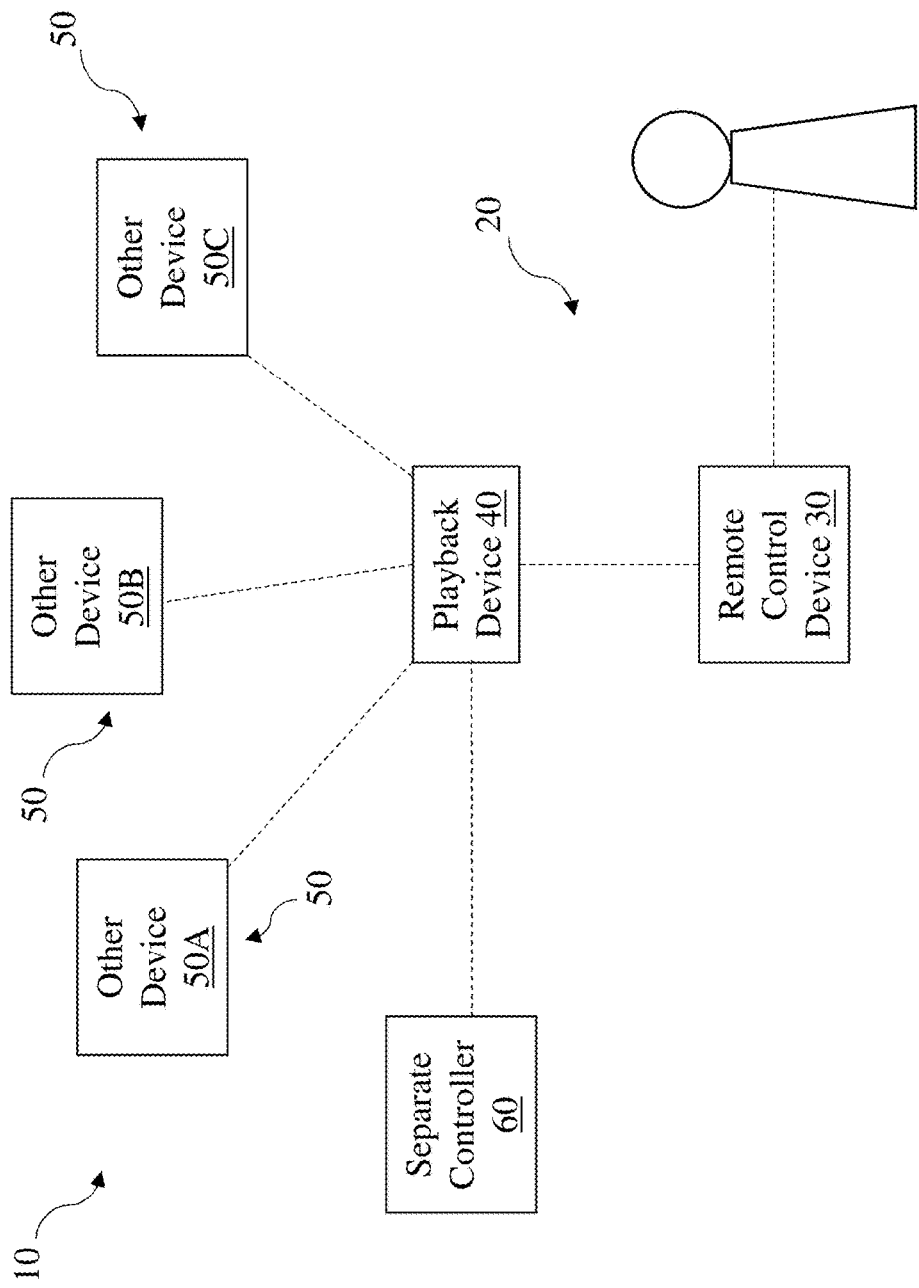
FIG. 1 depicts an illustrative environment including a system according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that an operating state-specific keypad can be beneficially incorporated into a remote control device to provide for added functionality and an improved user experience. For example, a remote control device can enable a user to quickly realize available control functions for a set of devices controlled via a playback device according to the operating state of that remote control device.

Commonly labeled components in the FIGURES are considered to be substantially equivalent components for the purposes of illustration, and redundant discussion of those components is omitted for clarity.

FIG. 1 shows an illustrative environment 10 including a system 20 according to various particular implementations. The system 20 can include a remote control device 30, and a playback device 40 communicatively coupled with the remote control device 30. The system 20 can additionally connect with one or more other devices 50 in the environment 10. These other devices 50 can include an audio content source and/or a video content source, e.g., a television (e.g., a smart TV), a video game console, a digital video disc (DVD) player, a digital optical disc (e.g., Blu-Ray) player, a cable and/or satellite receiver, a streaming media player (e.g., such as an Internet connected streaming media system), a Bluetooth-connected and/or Wi-Fi connected device (e.g., a smartphone or tablet), a digital video recorder (DVR), or a mobile computing device (e.g., a tablet or smartphone).

The playback device 40, as described herein, can include a speaker system. The speaker system can include a smart speaker (e.g., with communications and processing capabilities) or can include other conventional speaker hardware with one or more microphones, processing capability, and communication capability. In some cases, the playback device 40 can include a network interface providing for communication between the playback device 40 and remote control device 30, and the playback device 40 and other devices 50, e.g., audio sources and/or other networked (e.g., hard-wired and/or wireless connections) speaker packages and/or other audio playback devices via one or more communications protocols. The network interface may provide either or both of a wireless interface and a wired interface. The wireless interface allows the playback device 40 to communicate wirelessly with other devices (e.g., devices 50) in accordance with a communication protocol such as IEEE 802.11 (of varying protocol advancements) and/or other known protocols. In various particular implementations, the wireless interface allows the playback device 40 to communicate with other devices using an RF communications protocol. However, in other implementations, the wireless interface allows the playback device 40 to communication with other devices using an IR communications protocol. The wired interface provides network interface functions via a wired (e.g., Ethernet) connection. The playback device 40 can also include processor(s), audio hardware, power supplies for powering the various components, and memory. Each of the processor, graphical interface, network interface, audio hardware, power supplies, and memory can be interconnected using various buses, and several of the components may be mounted on a common motherboard or in other manners as appropriate. In some cases, the network interface may also include a network media processor for supporting, e.g., wireless streaming services.

In some cases, the playback device 40 includes a supplemental speaker system, configured to provide distinct (e.g., enhanced) audio output from one of the other devices 50. In example implementations, the playback device 40 is connected to a controller and/or audio receiver at the other device(s) 50, e.g., via a cable or any conventional wireless connection described herein. In some particular implementations, the playback device 40 may have only a single acoustic driver (mono audio), or in other implementations, playback device 40 may have multiple acoustic drivers arranged in, for example, a stereo, 5.1 or 7.2 audio system. An example 5.1 system has the following speakers: left front, center, right front, left surround, right surround and bass (low frequency effects). The playback device 40 could also be a 1.0 or 1.1 type of system, which is sometimes referred to as a "soundbar" (with or without a separate bass speaker). The playback device 40 can include audio processing hardware (such as a digital signal processor) and one or more power amplifiers. In some particular implementations, the playback device 40 includes an audio receiver and a control system to perform control functions associated with audio processing from the other device(s) 50. According to some implementations, the playback device 40 includes one or more microphones for receiving audio input and processing that input according to capabilities described herein.

In various implementations, a plurality of other devices 50 are connected with the playback device 40 to provide enhanced audio output relative to the audio output capabilities at those devices 50. In particular implementations, the other devices 50 can be linked (or, "paired") with the playback device 40 via an application or via instructions on one or more interfaces controlling the playback device 40 and/or the other devices 50. In some cases, the playback device 40 is linked to the other devices 50 via a wireless connection (e.g., using a wireless access point on a wireless network). A mobile computing device (e.g., smartphone or tablet) can be used to establish connection of the playback device 40 and the other device 50. In some cases, a user downloads a setup application via the mobile computing device (e.g., over an available Wi-Fi network or Bluetooth Low Energy (BLE) connection) and links the playback device 40 with one or more of the other devices 50. Once a link is established between the other devices 50 and the playback device 40, the playback device 40 is configured to provide audio output from the other devices 50 to the environment 10.

In still other implementations, a separate controller 60 is linked with the playback device 40 in order to control content playback at the playback device 40. In some cases, the separate controller 60 can include a mobile computing device (e.g., smartphone or tablet) separate from the other devices 50. However, in other cases, the separate controller 60 can be integrated in one or more of the other devices 50. In various implementations, the separate controller 60 can be configured to modify a current operating state of the playback device 40, e.g., which of the other devices 50 is selected as the playback source at that playback device 40.

The remote control device 30 can provide an efficient and compact mechanism for controlling audio output at the playback device 40. For example, where a plurality of other devices 50 (illustrated as distinct device types, 50A, 50B, 50C, etc.) are linked with the playback device 40, the remote control device 30 permits control of playback (e.g., audio playback and/or video playback) across the plurality of other devices 50. In particular implementations, the playback device 40 is configured to communicate with the remote control device 30 via one or more communications protocols, e.g., a Bluetooth communications protocol, a BLE communications protocol, a radio frequency (RF) communications protocol, a wireless local area networking communications protocol (e.g., 6LoWPAN), a Zigbee communications protocol, a Z-Wave communications protocol, a Wi-Fi communications protocol, a Wi-Fi direct communications protocol and/or a proprietary communications protocol (e.g., a proprietary RF communications protocol). As described herein, the remote control device 30 is operable to control one or more of the other devices 50 via the playback device 40.

In various implementations, the remote control device 30 is operable in a plurality of different operating states to control the playback device 40. That is, the remote control device 30 has a plurality of operating states (or, modes) which permit specific control of one or more functions of the other devices 50. In turn, the playback device 40 has a plurality of operating states (or, modes) which correspond with the source of playback (e.g., audio playback) from the other devices 50.

Figure 2:
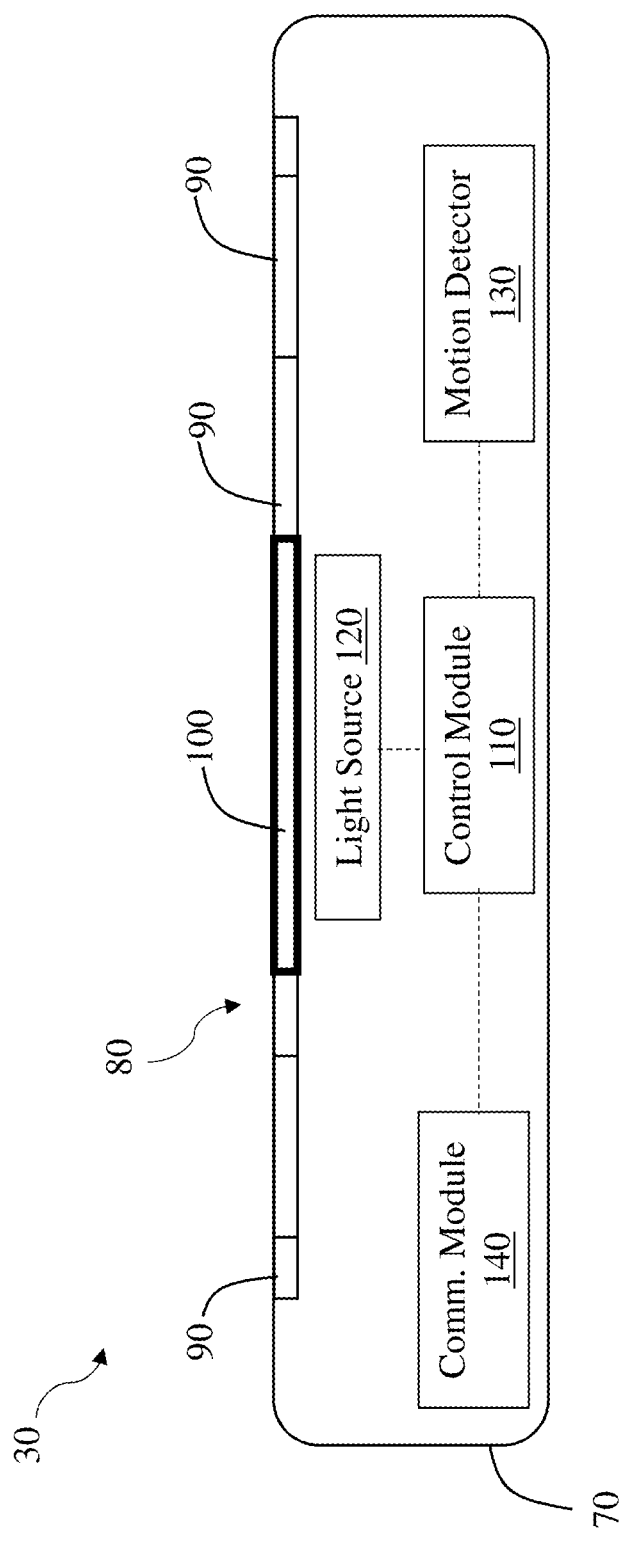
FIG. 2 is a cross-sectional depiction of a remote control device according to various particular implementations.

The remote control device 30 is illustrated in greater detail in the schematic cross-sectional depiction of FIG. 2. In this example, remote control device 30 is shown including a casing 70 housing various components. In some implementations, the casing 70 includes a keypad 80 having a set of actuatable buttons (or "buttons") 90 for controlling the playback device 40 (FIG. 1). As described herein, the keypad 80 has modifiable display characteristics (and control characteristics) to selectively display buttons 90 for actuation, e.g., by a user. The buttons 90 can include (or be integrated with) pressure sensors or other sensor devices to detect actuation (e.g., contact force) by a user. Additionally, the keypad 80 can include a set of permanent buttons 100 distinct from the set of actuatable buttons 90. These permanent buttons 100, as described herein, are permanently displayed at the keypad 80 regardless of the operating state of the remote control device 30. In some implementations, these permanent buttons 100 are molded, etched or otherwise delineated in the keypad 80. In some cases, the permanent buttons 100 are recessed in the keypad 80, however, in other cases, the permanent buttons 100 are elevated relative to a remainder of the keypad 80. These permanent buttons 100 can provide a tactile reference point for the user, such that regardless of the operating state of the remote control device 30, the user can contact the keypad 80 and feel at least one of these permanent buttons 100. It is understood that in various implementations, the permanent buttons 100 can be selectively actuatable. That is, although permanent buttons 100 may be permanently delineated on the keypad 80, they are not always highlighted for actuation. In this sense, the permanent buttons 100 can be controllable in a similar manner as the actuatable buttons 90 to permit control of particular functions at the other devices 50.

The remote control device 30 can also include a control module 110 configured to highlight one or more distinct subsets of the set of (actuatable) buttons 90 at the keypad 80 based upon a current operating state of the remote control device 30. The control module 110 can be configured to highlight one or more buttons 90 at the keypad 80 to differentiate those buttons 90 from other portions of the keypad 80. For example, in some cases, the control module 110 includes a programmable processor configured to execute functions according to various implementations described herein. The control module 110 can be configured to control functions (e.g., highlighting functions of one or more buttons 90) at keypad 80. In various implementations, the process of "highlighting" buttons 90 at the keypad 80 can be performed using relative lighting and/or coloring differentiation. That is, some buttons 90 may be backlit while others are not backlit, such that some are visible to the naked eye while others appear substantially identical to the adjacent casing 70 (e.g., substantially invisible to a user's naked eye, also referred to as "dead-fronted"). In particular implementations, the casing 70 is a dark, translucent color (e.g., a matte black color) which obscures the buttons 90 such that these buttons cannot be seen by a user (e.g., human user) without backlighting. In other cases, the color or intensity of backlighting can be varied to highlight particular buttons 90 relative to other buttons 90. However, in other implementations, buttons 90 can be highlighted using relative distinctions in terms of tactile sensation (e.g., texture, elevation or vibration).

In a particular implementation, the control module 110 can be coupled with a light source 120 located proximate the keypad 80 (e.g., underlying the keypad 80). As described further herein, the light source 120 is configured to highlight one or more distinct subsets of the (actuatable) buttons 90 in response to a highlight command from the control module 110.

Additionally, the remote control device 30 can include a motion detector 130 coupled with the control module 110 for detecting movement of the remote control device 30 and/or contact with the remote control device 30. In certain implementations, the motion detector 130 includes at least one of a gyroscope, an optical sensor, or an accelerometer. The motion detector 130 can be configured to detect movement of the remote control device 30 or contact with the remote control device 30 (e.g., when a user picks up or nudges the remote control device 30), and can also be configured to detect when a user contacts the keypad 80 of the remote control device 30 (e.g., via coupling with the keypad 80 and/or independent motion detection). As described herein, the remote control device 30 (e.g., at the control module 110) can be configured to detect motion (e.g., via the motion detector 130) and initiate a highlighted display of a subset of the buttons 90 based upon an operating state of the remote control device 30.

The remote control device 30 can further include a communications (comm.) module 140 coupled with the control module 110 and configured to communicate with the playback device 40, other devices 50, and in some cases, separate controller 60. The communications module 140 can include, e.g., a network interface as discussed herein, and/or a conventional Bluetooth interface, BLE interface, RF interface, a Zigbee interface, a Z-Wave interface, a Wi-Fi interface, a Wi-Fi direct interface or a wireless local area networking interface (e.g., a local area network (LAN), wide area network (WAN), or personal area network (PAN)). In some cases, as described herein, the communications module 140 is configured to receive commands from the playback device 40 about a current operating state of that playback device 40, over one or more protocols described herein (e.g., via an RF interface).

Additionally, playback device 40 can be configured to control the other devices 50 using one or more protocols described herein. In a particular example implementation, playback device 40 is configured to control other devices 50 using infra-red (IR) commands.

Figure 3:
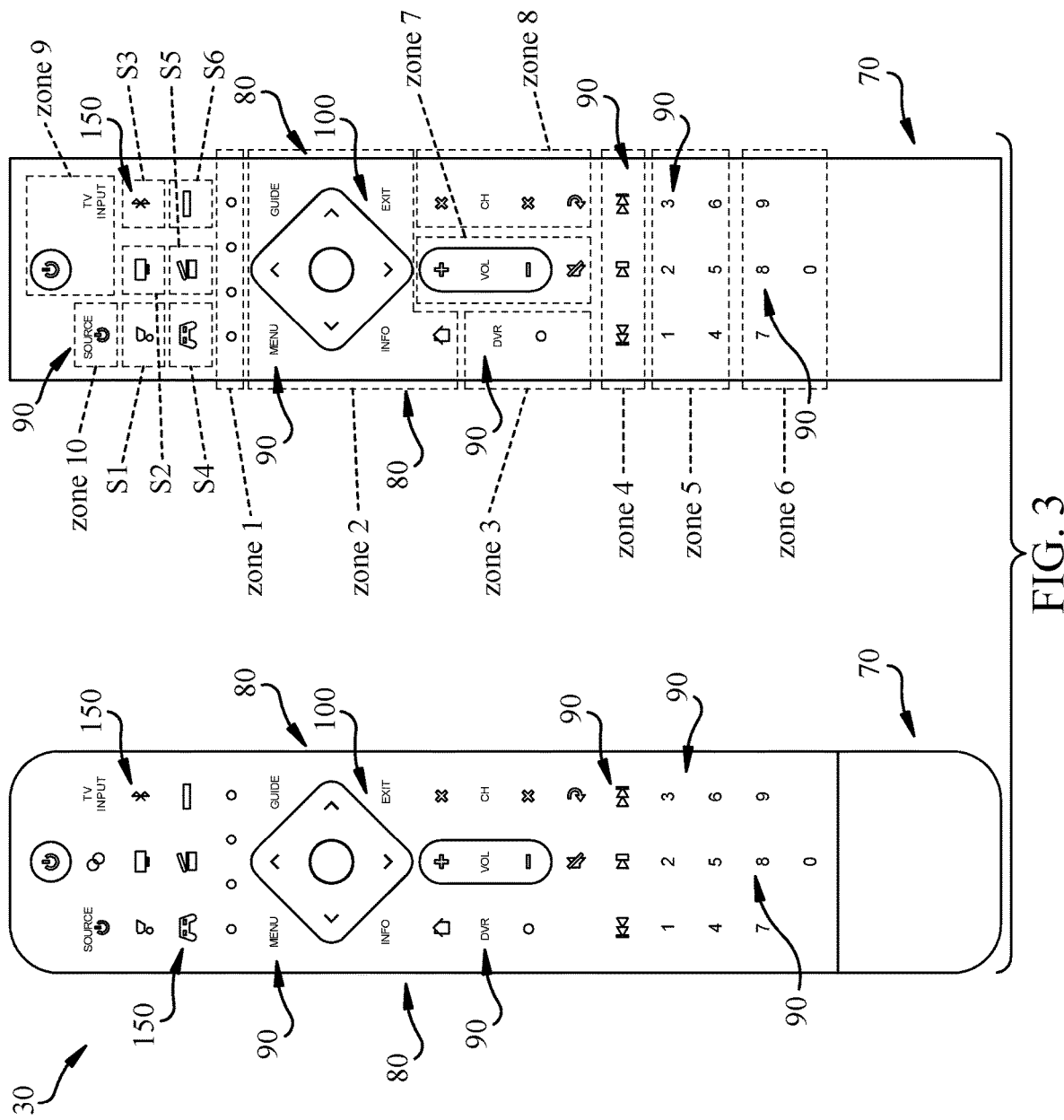
FIG. 3 is a rendering of an example physical remote control device adjacent a corresponding button outline diagram according to various particular implementations.

FIG. 3 is a rendering of an example remote control device 30 along with a corresponding schematic plan view of the remote control device 30 with overlying subsets of buttons 90 delineated by zones (e.g., zones 1-10) on the keypad 80. Also illustrated in this depiction are source buttons 150. In these implementations, source buttons 150 correspond to a different one of the operating states of the remote control device 30, and can be operable to select the current operating state of the remote control device 30. According to some implementations, the remote control device 30 is configured to distinguish a source button 150 associated with the current operating state of the remote control device 30 from the other source buttons 150, e.g., via color differentiation, lighting differentiation (e.g., intensity) or other highlighting distinctions noted herein. In particular implementations, all of the source buttons 150 are highlighted when any button 90 is highlighted in order to permit the user to switch from the current operating state to a distinct operating state.

In some example implementations, the light source 120 is configured to perform at least one of: a) highlighting one or more of the distinct subsets of the set of actuatable buttons 90 in response to a highlight command from the control module 110, b) highlighting a source button 150 on the keypad 80 associated with the current operating state of the remote control device 30 from other source buttons 150 on the keypad 80 associated with distinct operating states of the remote control device 30, or c) distinguishing the source button 150 associated with the current operating state of the remote control device 30 from the other source buttons 150 associated with the distinct operating states of the remote control device 30 via at least one of a relative difference in illumination or a difference in color.

In the example shown in FIG. 3, zones (e.g., zones 1-10) are associated with particular functions of the remote control device 30. That is, each of the highlighted distinct subsets (e.g., zones) of the buttons 90 corresponds with at least one function associated with the current operating state of the remote control device 30. In particular cases, only zones with buttons that correspond to a function of the other device 50 are highlighted. For example, zone 8 includes buttons 90 associated with channel control functions for a particular other device 50 such as a television or streaming media device, while zone 3 includes buttons 90 associated with DVR functions. Zone 2 provides an example of permanent buttons 100 that may be used across a number of other devices 50, and provide a reference indicator for the user on the keypad 80. It is understood that a plurality of zones can be associated with a particular other device 50, such that multiple zones can be highlighted for each operating mode (e.g., where a smart TV has highlighted zones 2 and 5-9, or an audio streaming system has highlighted zones 2, 4 and 9).

Figure 4:
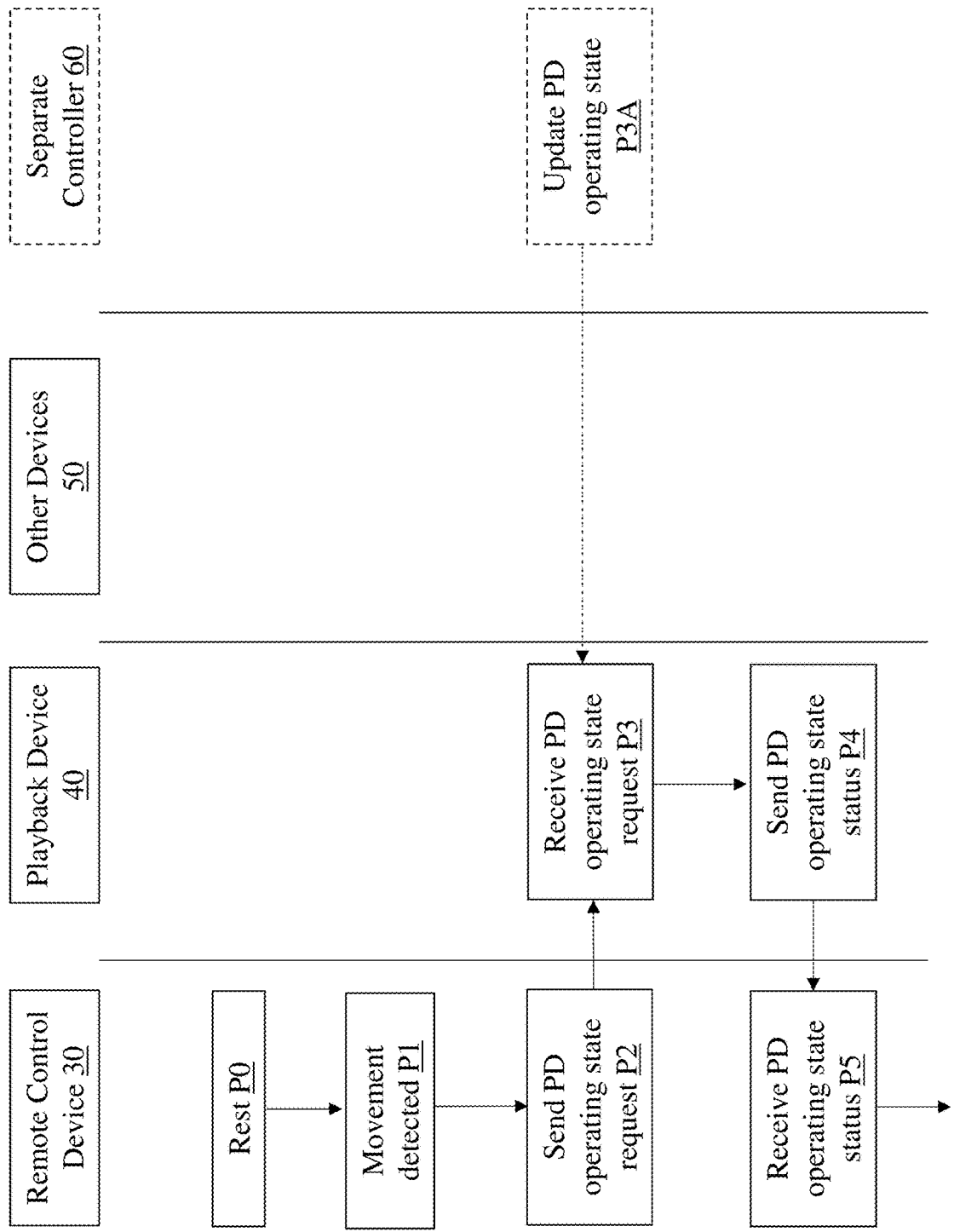
FIG. 4 and FIG. 5 collectively form a swim lane diagram illustrating processes performed by a system according to various implementations.
Figure 5:
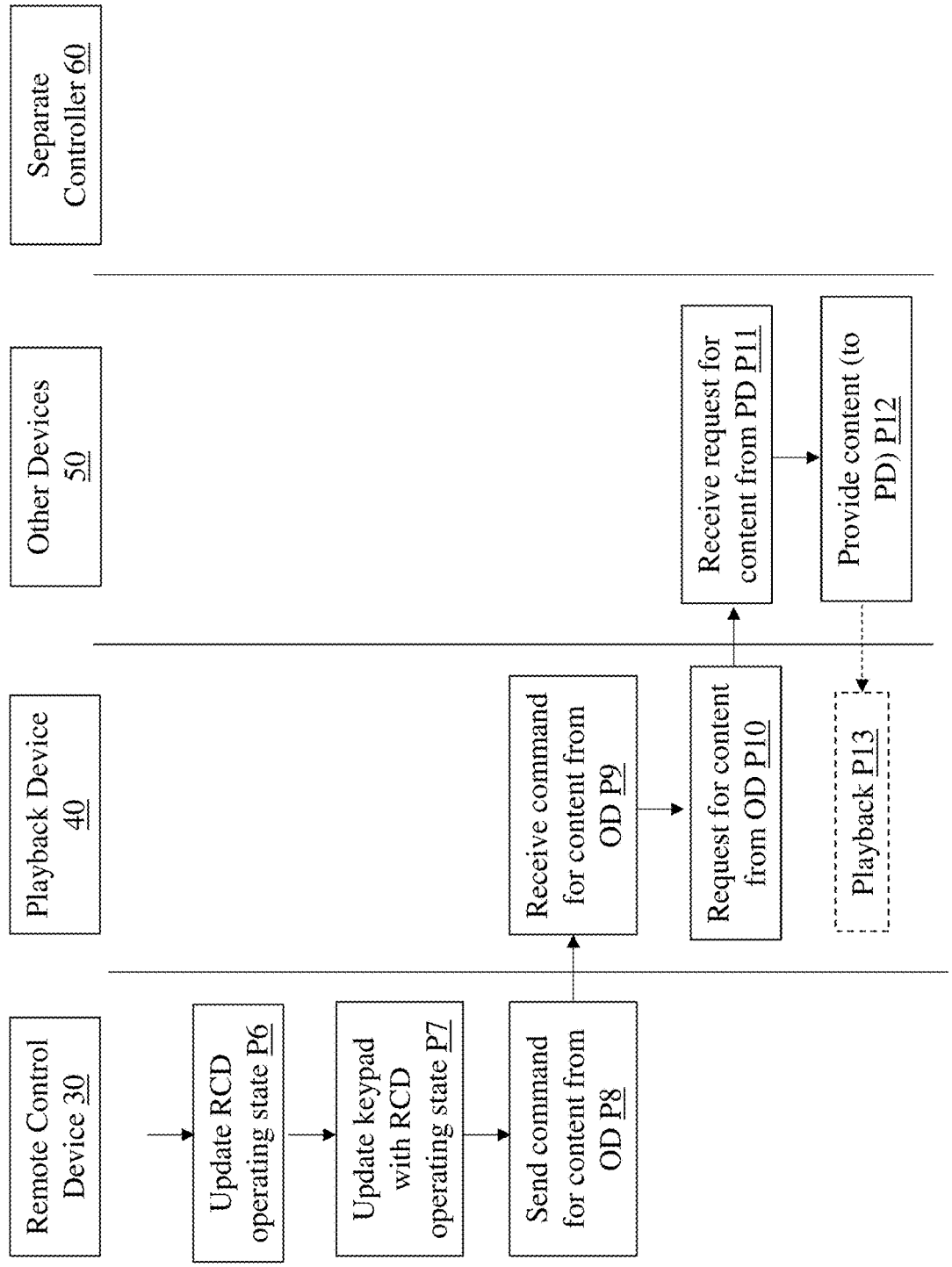

FIGS. 4 and 5 show a swim lane diagram illustrating control processes performed by the system 20 (FIG. 1) to provide a context-sensitive remote control experience to a user. FIGS. 4 and 5 are referred to in conjunction with the schematic depictions of the remote control device 30 at different operating modes in FIGS. 6-8, with continuing reference to the depiction of button zones in FIG. 3. The swim lane diagram is used to show the relationship between the remote control device 30, the playback device 40, the other devices 50 and the separate controller 60 (e.g., a mobile computing device such as a smartphone or a tablet) and to define the processes involved in controlling display at the remote control device 30. The processes of FIGS. 4 and 5 may be implemented on computer program code in combination with appropriate hardware. The computer program code may be stored on storage media such as a hard disk or other computer storage media, as well as a memory storage device or collection of memory storage devices such as read only memory or random access memory. Additionally the computer program code can be transferred to the devices over the Internet or another network.

Figure 6:
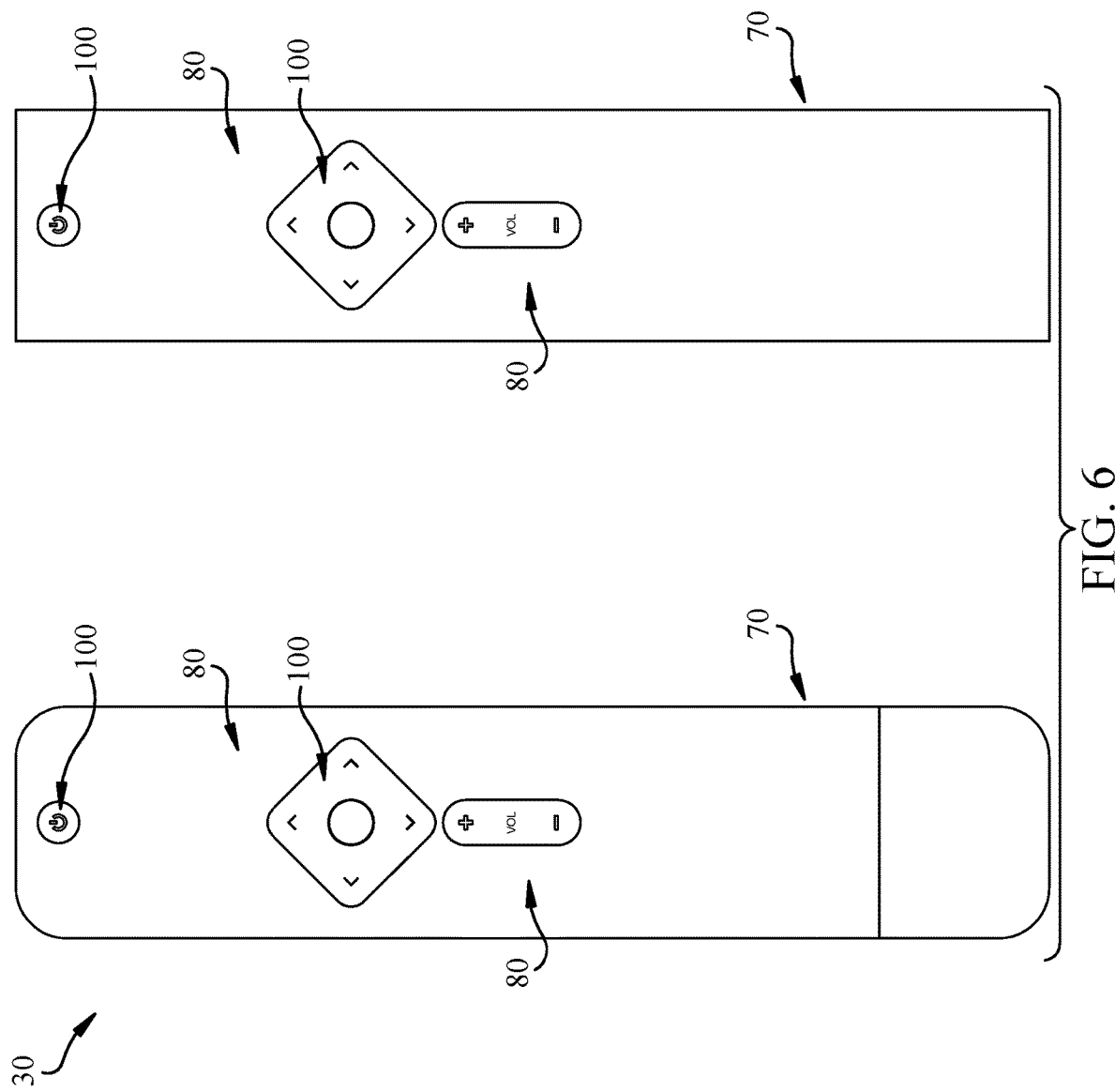
FIG. 6 is a rendering of an example physical remote control device adjacent a corresponding button outline diagram according to various particular implementations.

Referring to FIGS. 4 and 5, four swim lanes are shown including a lane for each of the remote control device 30, the playback device 40, the other devices 50 and the separate controller 60. In an initial state (process P0) the remote control device 30 is at rest. FIG. 6 is a rendering of an example remote control device 30 in a resting state, further including a corresponding button outline diagram. With continuing reference to the zones displayed in FIG. 3, in this example, the arrow buttons, volume control buttons and power button in zones 2, 7 and 9, respectively, are shown as permanent buttons 100. That is, in this resting state, the permanent buttons 100 are visibly distinct from the other buttons 90 (FIG. 3), and in various implementations, are tactilely distinguished (e.g., via insetting, elevation or texture distinction) from the remainder of the keypad 80. In this example, the actuatable buttons 90 are not highlighted in the resting state. That is, in particular example implementations, the buttons 90 are "dead fronted" in the resting state, such that these buttons 90 are not illuminated. In these implementations, the buttons 90 may be present (e.g., outlined or otherwise demarcated) at the keypad 80, but not visible due to the lack of back lighting. In this resting state, the control module 110 does not activate the light source 120 behind any of the actuatable buttons 90.

Returning to FIG. 4, the remote control device 30 is configured to detect movement or user contact (e.g., via motion detector 130, FIG. 2) of the remote control device 30 (process P1) and send a request to the playback device 40 (PD) for the operating state of that playback device 40 (process P2). In some cases, the request to the playback device 40 is sent by the communications module 140, e.g., via a network interface as discussed herein, and/or a conventional BLE interface, RF interface, or wireless local area networking interface. In particular cases, the remote control device 30 sends the PD operating state request over BLE.

The playback device 40 receives the (PD) operating state request from the remote control device 30 in process P3. In these cases, the playback device 40 detects its operating state data stored at its local memory. The playback device 40 then sends an indicator of its operating state data (PD operating state status) back to the remote control device (process P4). In some cases, this PD operating state status is sent via RF communications. The remote control device 30 receives the PD operating state status in process P5.

It is understood that at any time during this process, the playback device operating state can be updated via a separate controller 60, as described herein. This process is illustrated in phantom as process P3A in FIG. 4, in order to indicate that the separate controller 60 may update the operating state of that playback device 40. In these cases, the separate controller 60 can modify the current operating state of the playback device 40, and the control module 110 at the remote control device 30 is configured to update the current operating state of the remote control device 30 by highlighting one or more of the distinct subsets (e.g., zones) of the actuatable buttons 90 based upon that modified current operating state of the playback device 30.

Turning to FIG. 5, after receiving the operating state status of the playback device 40 in process P5, the remote control device (or, RCD) 30 can update its operating state based upon the operating state of the playback device 40 in process P6, e.g., to match the operating state of the playback device 40. In this case, the control module 110 receives updated data about the operating state of the remote control device 30, and updates the keypad 80 (e.g., via light source 120) in process P7. Once the keypad 80 is updated to highlight the buttons 90 corresponding to the operating state of the remote control device 30, a user can select one or more of the highlighted buttons 90 to request content (e.g., audio content such as an audio stream, particular song, etc.) from the other device 50 (process P8), or perform any number of actuatable functions based upon the highlighted buttons 90, e.g., change operating state of the remote control device 30, modify behavior within a given operating state (e.g., play, pause, rewind), adjust volume of playback, etc. In some cases, where the user selects one or more buttons 90 to request content, the playback device 40 can receive the content request, e.g., via a communications module (process P9) and send a corresponding request to the other device 50 for the content (process P10). The other device 50 can receive the request for content (e.g., via an IP command sent using a communications module, an IR command sent via an IR blast to a receiver at the other device 50 such as an IR receiver, or via instructions sent over a hard-wired connection such as an High-Definition Multimedia Interface (HDMI) or other conventional connection) in process P11. The other device 50 can provide that content (e.g., audio content) to the playback device 40 (process P12) in some cases. The playback device 40 can be configured to playback the content, e.g., via its corresponding speaker system (process P13).

However, it is understood that the other devices 50 can be configured to provide content directly to the user without associated playback through the playback device 40. That is, the other devices 50 can be configured to provide content, or part of the content, through those devices (or additional other devices 50) without utilizing playback device 40. This is illustrated in FIG. 5, where process P13 is shown in phantom as being performed at playback device 40. In some examples, where the other device(s) 50 include a television or other video player, the other device(s) 50 can provide the video content (and in some cases, audio content as well) to the user. While corresponding audio content for that video can be played at the playback device 40, at least a portion of the overall content is still provided to the user via the other device 50. It is further understood that in some implementations, the other device(s) 50 may provide all content playback to the user, depending upon the content request and device capabilities.

Figure 7:
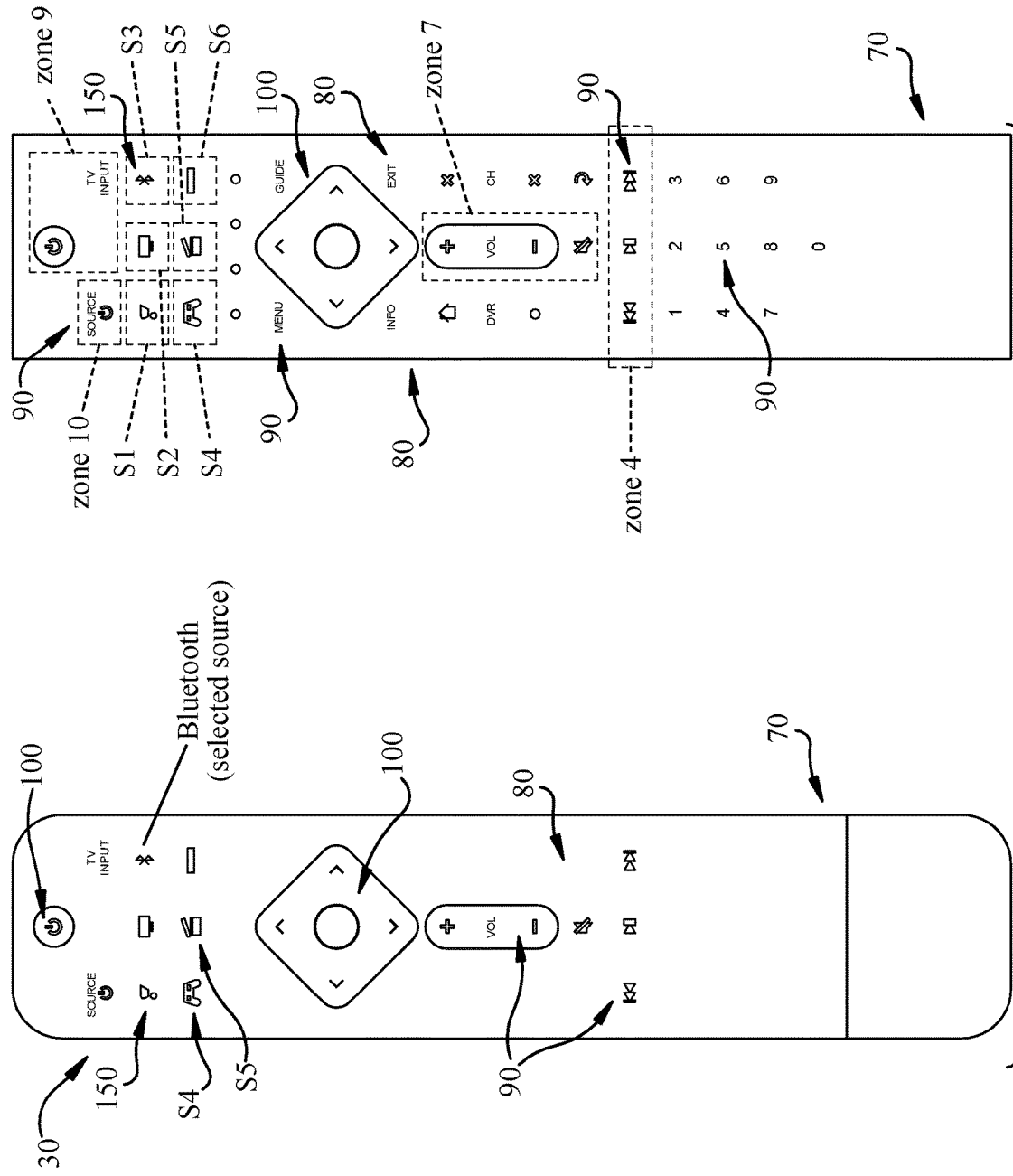
FIG. 7 shows a rendering of an example physical remote control device adjacent a corresponding button outline diagram, according to various particular implementations.
Figure 8:
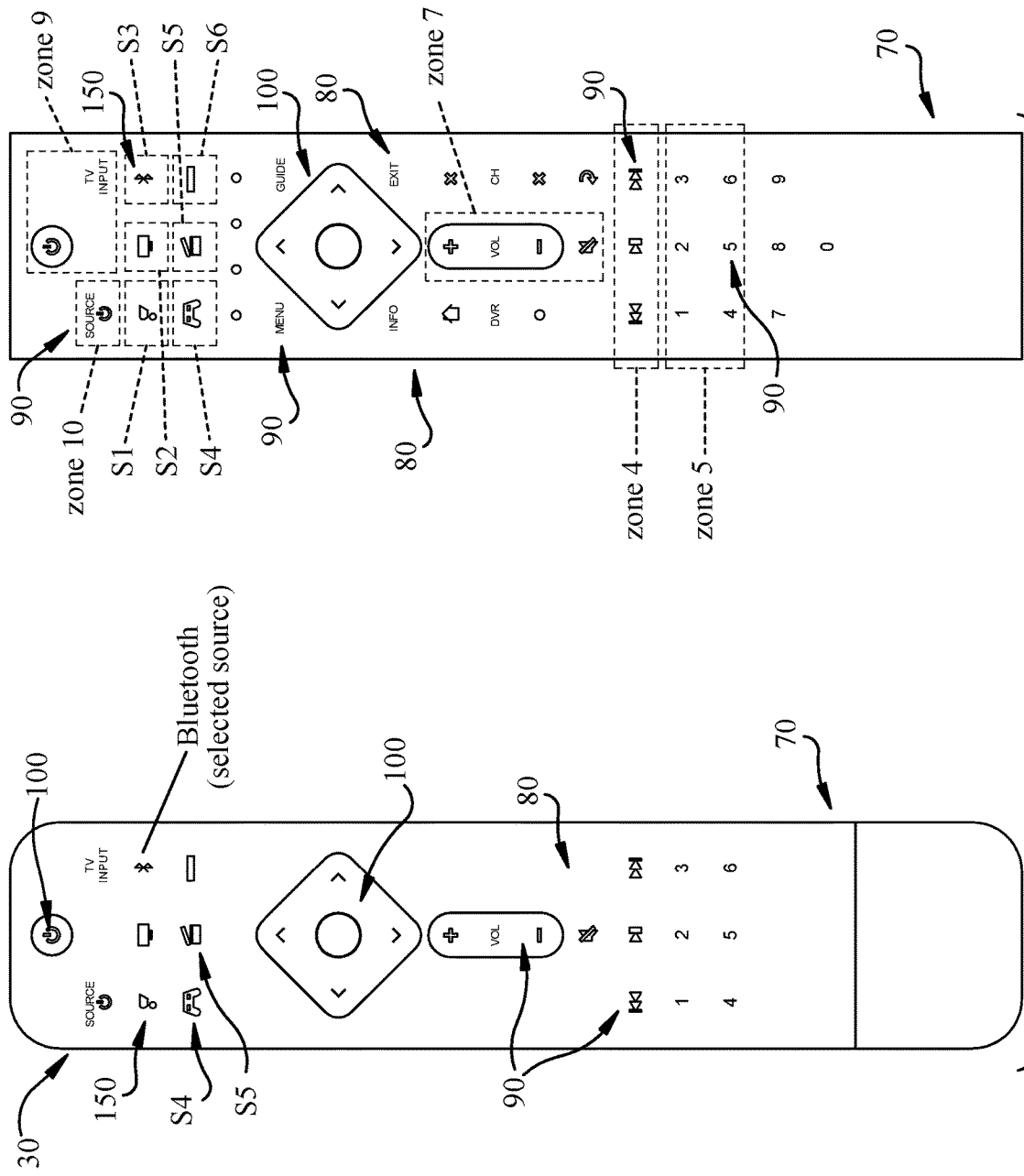
FIG. 8 shows an example rendering of a physical remote control device adjacent a corresponding button outline diagram, according to various additional implementations.

FIG. 7 shows an example schematic depiction of the physical remote control device 30 adjacent a corresponding button outline diagram, illustrating highlighting of particular buttons 90 according to the operating state of the remote control device 30. In this example, where the operating state of the remote control device 30 is Bluetooth (button S3 in source buttons 150), actuatable buttons in zones 4, 7, 9 and 10 are highlighted to permit control of Bluetooth-linked other devices 50. FIG. 8 illustrates an additional example, where the operating state of the remote control device 30 is set to an audio playback device (e.g., a streaming music system such as a smart speaker). In this example, actuatable buttons in zones 4, 5, 7, 9 and 10 are highlighted to permit control of the audio playback device.

The examples in FIGS. 7 and 8 are merely illustrative of various possible combinations of buttons 90 and means for highlighting such buttons 90. It is understood that in some cases, all buttons 90 can be highlighted after initiating movement (or user contact) of the remote control device 30 (or user contact with the remote control device 30), with particular subsets of the buttons 90 being highlighted in distinct colors, or with distinct intensities, based upon the operating state of the remote control device 30. Additionally, as noted herein, other means for highlighting such buttons 90 can be employed to provide the user with a set of buttons 90 which correspond to the functions associated with the operating state of the remote control device 30.

In some example implementations, as discussed herein, the remote control device 30 is configured to control functions of the playback device 40 (volume, power, etc.), and need not be set in an operating state corresponding strictly with the other devices 50. For example, in some cases, one or more buttons associated with functions of the playback device 40 can be highlighted in addition to buttons associated with functions of the other devices 50. In some of these implementations, the buttons 90 associated with functions of the playback device 40 can be highlighted in a distinct manner from buttons 90 associated with functions of the other device 50, via light intensity, color, bordering, background, etc.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A remote control device operable in a plurality of different operating states, the remote control device comprising:
   a casing including a keypad comprising:
      a set of actuatable buttons for controlling a playback device, wherein the remote control device is operable to control one or more other devices via the playback device; and
      a set of permanent buttons distinct from the set of actuatable buttons,
      wherein the casing has a translucent color that obscures the actuatable buttons such that the actuatable buttons cannot be seen by a naked eye of a human user without highlighting, and wherein the actuatable buttons are not highlighted in a resting state; and
   a control module configured to:
      highlight one or more distinct subsets of the set of actuatable buttons at the keypad based upon a current operating state of the remote control device; and
      in response to detecting movement of the remote control device or user contact with the keypad, highlight one or more of the distinct subsets of the set of actuatable buttons at the keypad based upon the current operating state of the remote control device,
      wherein the set of permanent buttons are permanently displayed at the keypad regardless of the current operating state of the remote control device, and the set of permanent buttons provide a tactile reference point at the keypad, and
      wherein the permanent buttons are selectively highlighted in only some of the operating states of the remote control device, and are only actuatable when highlighted.

2. The remote control device of claim 1, further comprising:
   a light source coupled with the control module and located proximate the keypad, wherein the light source is configured to highlight one or more of the distinct subsets of the set of actuatable buttons in response to a highlight command from the control module.

3. The remote control device of claim 1, further comprising:
   a communications module coupled with the control module, wherein the communications module is configured to communicate with the playback device to detect a current operating state of the playback device in response to the detected movement of the remote control device or user contact with the keypad, and based upon the communication, update the current operating state of the remote control device to coincide with the current operating state of the playback device, wherein the communications module is configured to communicate with the playback device over a Bluetooth Low Energy (BLE) communications protocol, a radio frequency (RF) communications protocol, a wireless local area networking communications protocol, a Zigbee communications protocol, a Z-Wave communications protocol, a Wi-Fi communications protocol or a Wi-Fi direct communications protocol.

4. The remote control device of claim 1, further comprising a motion detector coupled with the control module, wherein the playback device is configured to control operation of a plurality of other devices, the plurality of other devices including at least one of an audio content source or a video content source.

5. The remote control device of claim 1, wherein the playback device is configured to receive control commands from a separate controller distinct from the remote control device, wherein the separate controller is configured to modify a current operating state of the playback device, and wherein the control module is configured to update the current operating state of the remote control device by highlighting one or more of the distinct subsets of the actuatable buttons based upon the modified current operating state of the playback device.

6. The remote control device of claim 1, wherein each of the highlighted distinct subsets of the actuatable buttons corresponds with at least one function associated with the current operating state of the remote control device.

7. The remote control device of claim 1, wherein, in at least one of the operating states of the remote control device, the remote control device is configured to control another device via the playback device.

8. The remote control device of claim 1, wherein the keypad further comprises a set of source buttons each corresponding to a different one of the operating states of the remote control device, wherein the source buttons are operable to select the current operating state of the remote control device,
wherein the remote control device is configured to distinguish the source button associated with the current operating state of the remote control device from the other source buttons in the set of source buttons.

9. The remote control device of claim 1, further comprising:
a light source coupled with the control module and located proximate the keypad, wherein the light source is configured to distinguish a source button associated with the current operating state of the remote control device from other source buttons associated with distinct operating states of the remote control device via at least one of a relative difference in illumination or a difference in color.

10. The remote control device of claim 1, wherein the highlighting includes backlighting one or more of the distinct subsets of the set of actuatable buttons, wherein the permanent buttons provide the tactile reference point regardless of the operating state of the remote control device, and wherein the set of actuatable buttons do not provide a tactile reference point at the keypad in any operating state.

11. A system comprising:
a playback device; and
a remote control device operable in a plurality of different operating states and communicatively coupled with the playback device, the remote control device comprising:
a casing including a keypad comprising:
a set of actuatable buttons for controlling the playback device, wherein the casing has a translucent color that obscures the actuatable buttons such that the actuatable buttons are substantially invisible to a naked eye of a human user without highlighting, wherein the actuatable buttons are not highlighted in a resting state, wherein the translucent color further obscures the actuatable buttons such that the actuatable buttons cannot be seen by the naked eye of the human user without highlighting, wherein the highlighting includes backlighting one or more of the distinct subsets of the set of actuatable buttons; and
a set of permanent buttons distinct from the set of actuatable buttons, the set of permanent buttons being permanently displayed at the keypad regardless of the current operating state of the remote control device, wherein the set of permanent buttons provide a tactile reference point at the keypad regardless of the current operating state of the remote control device, and wherein the set of actuatable buttons do not provide a tactile reference point at the keypad in any operating state;
a control module configured to:
highlight one or more distinct subsets of the set of actuatable buttons at the keypad based upon a current operating state of the remote control device; and
in response to detecting movement of the remote control device or user contact with the keypad, highlight one or more of the distinct subsets of the set of actuatable buttons at the keypad based upon the current operating state of the remote control device,
wherein the permanent buttons are selectively highlighted in only some of the operating states of the remote control device, and are only actuatable when highlighted; and
a communications module coupled with the control module, the communications module configured to:
communicate with the playback device to detect a current operating state of the playback device in response to the detected movement of the remote control device or user contact with the keypad, and
based upon the communication, update the current operating state of the remote control device to coincide with the current operating state of the playback device.

12. The system of claim 11, wherein the remote control device further comprises:
a light source coupled with the control module and located proximate the keypad, wherein the light source is configured to perform at least one of:
highlighting one or more of the distinct subsets of the set of actuatable buttons in response to a highlight command from the control module,
highlighting a source button on the keypad associated with the current operating state of the remote control device from other source buttons on the keypad associated with distinct operating states of the remote control device, or distinguishing the source button associated with the current operating state of the remote control device from the other source buttons associated with the distinct operating states of the remote control device via at least one of a relative difference in illumination or a difference in color.

13. The system of claim 11, wherein the playback device is configured to perform at least one of:

controlling operation of a plurality of other devices, or receiving control commands from a separate controller distinct from the remote control device, wherein the separate controller is configured to modify a current operating state of the playback device, and wherein the control module is configured to update the current operating state of the remote control device by highlighting one or more of the distinct subsets of the actuatable buttons based upon the modified current operating state of the playback device.

14. A remote control device operable in a plurality of different operating states, the remote control device comprising:

a control module; and a casing housing the control module, the casing including a keypad comprising:

a set of actuatable buttons for controlling a playback device, and a set of permanent buttons distinct from the set of actuatable buttons at the keypad, wherein the set of permanent buttons are permanently displayed at the keypad regardless of a current operating state of the remote control device, wherein the set of permanent buttons provide a tactile reference point at the keypad, wherein the control module is configured to highlight one or more distinct subsets of the set of actuatable buttons at the keypad based upon the current operating state of the remote control device, wherein the casing has a translucent color that obscures the actuatable buttons such that the actuatable buttons cannot be seen by a naked eye of a human user without highlighting, wherein the actuatable buttons are not highlighted in a resting state, and wherein the permanent buttons are selectively highlighted in only some of the operating states of the remote control device, and are only actuatable when highlighted.

15. The remote control device of claim 14, wherein the highlighting includes backlighting one or more of the distinct subsets of the set of actuatable buttons, wherein the permanent buttons provide the tactile reference point regardless of the current operating state of the remote control device, and wherein the set of actuatable buttons do not provide a tactile reference point at the keypad in any operating state.

* * * * *